US011017588B2

(12) United States Patent
Yoshimura et al.

(10) Patent No.: US 11,017,588 B2
(45) Date of Patent: May 25, 2021

(54) IMAGE PROCESSING APPARATUS THAT GENERATES A VIRTUAL VIEW IMAGE FROM MULTIPLE IMAGES CAPTURED FROM DIFFERENT DIRECTIONS AND METHOD CONTROLLING THE SAME

(71) Applicant: CANON KABUSHIKI KAISHA, Tokyo (JP)

(72) Inventors: Kazuhiro Yoshimura, Kawasaki (JP); Kaori Taya, Yokohama (JP); Shugo Higuchi, Inagi (JP); Tatsuro Koizumi, Niiza (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/814,156

(22) Filed: Mar. 10, 2020

(65) Prior Publication Data
US 2020/0211271 A1 Jul. 2, 2020

Related U.S. Application Data

(63) Continuation of application No. 15/712,326, filed on Sep. 22, 2017, now Pat. No. 10,628,993.

(30) Foreign Application Priority Data

Sep. 30, 2016 (JP) ................................. 2016-194778

(51) Int. Cl.
G06T 15/20 (2011.01)
G06T 15/50 (2011.01)
(52) U.S. Cl.
CPC .......... *G06T 15/205* (2013.01); *G06T 15/50* (2013.01); *G06T 2210/62* (2013.01)

(58) Field of Classification Search
None
See application file for complete search history.

(56) References Cited

U.S. PATENT DOCUMENTS 5,566,280 A 10/1996 Fukui
7,101,283 B2 9/2006 Okamoto
(Continued)

FOREIGN PATENT DOCUMENTS

JP H0785312 A 3/1995
JP 2001276420 A 10/2001
(Continued)

OTHER PUBLICATIONS

Elmqvist, Niklas, Ulf Assarsson, and Philippas Tsigas. "Employing dynamic transparency for 3D occlusion management: Design issues and evaluation." IFIP Conference on Human-Computer Interaction. Springer, Berlin, Heidelberg, 2007.*
(Continued)

*Primary Examiner* — Zhengxi Liu
(74) *Attorney, Agent, or Firm* — Rossi, Kimms & McDowell LLP

(57) ABSTRACT

A system comprises an obtainment unit that obtains virtual viewpoint information relating to a position and direction of a virtual viewpoint; a designation unit that designates a focus object from a plurality of objects detected based on at least one of the plurality of images captured by the plurality of cameras; a decision unit that decides an object to make transparent from among the plurality of objects based on a position and direction of a virtual viewpoint that the virtual viewpoint information obtained by the obtainment unit indicates, and a position of the focus object designated by the designation unit; and a generation unit that generates, based on the plurality of captured images obtained by the (Continued)

plurality of cameras, a virtual viewpoint image in which the object decided by the decision unit is made to be transparent.

20 Claims, 9 Drawing Sheets

(56) References Cited

U.S. PATENT DOCUMENTS

| | | | |
|---|---|---|---|
| 8,943,535 B2 | 1/2015 | Sakamoto | |
| 2008/0180439 A1 | 7/2008 | Adabala | |
| 2009/0110239 A1 | 4/2009 | Chen | |
| 2009/0129630 A1 | 5/2009 | Gloudemans | |
| 2014/0085203 A1 | 3/2014 | Kobayashi | |
| 2015/0042812 A1* | 2/2015 | Tang | G06K 9/00342 348/157 |
| 2015/0335996 A1 | 11/2015 | Watanabe | |

FOREIGN PATENT DOCUMENTS

| | | |
|---|---|---|
| JP | 2003044868 A | 2/2003 |
| JP | 2007135819 A | 6/2007 |
| JP | 2008071260 A | 3/2008 |
| JP | 5011224 B2 | 8/2012 |
| JP | 5295416 B1 | 9/2013 |
| JP | 5593356 B2 | 9/2014 |
| JP | 2015114716 A | 6/2015 |
| JP | 2015219882 A | 12/2015 |

OTHER PUBLICATIONS

Office Action issued in Japanese Appln. No. 2016-194778 dated Jun. 29, 2018.

Office Action issued in Japanese Appln. No. 2018-175336 dated Jan. 6, 2020.

Office Action issued in U.S. Appl. No. 15/712,326 dated Jan. 18, 2019.

Office Action issued in U.S. Appl. No. 15/712,326 dated Jul. 17, 2019.

Notice of Allowance issued in U.S. Appl. No. 15/712,326 dated Dec. 18, 2019.

\* cited by examiner

F I G. 4

| ID | TYPE | PARTIAL SHAPE INFORMATION | POSITION AND ORIENTATION INFORMATION | FOCUS FLAG | TRANSPARENCY FLAG |
|---|---|---|---|---|---|
| 0001 | GROUND | ...... | ...... | 0 | 1 |
| 0002 | GOAL POST | ...... | ...... | 0 | 0 |
| 0003 | GOAL POST | ...... | ...... | 0 | 0 |
| 0004 | BALL | ...... | ...... | 1 | 0 |
| 0005 | PERSON | ...... | ...... | 1 | 0 |
| 0006 | PERSON | ...... | ...... | 1 | 0 |
| 0007 | PERSON | ...... | ...... | 1 | 0 |
| ..... | ..... | ..... | ..... | ..... | ..... |

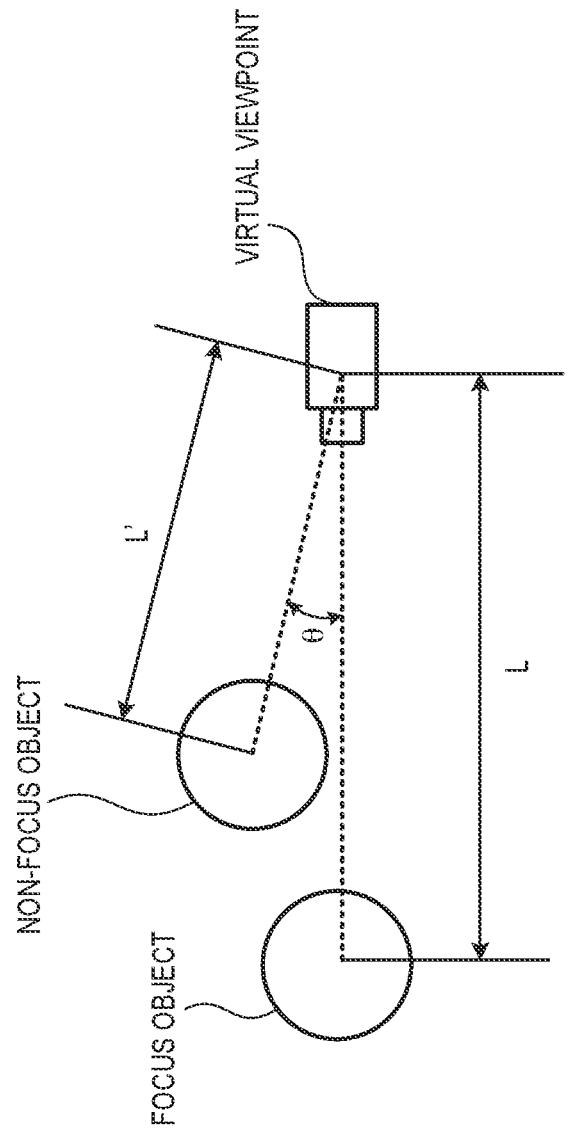

IMAGE PROCESSING APPARATUS THAT GENERATES A VIRTUAL VIEW IMAGE FROM MULTIPLE IMAGES CAPTURED FROM DIFFERENT DIRECTIONS AND METHOD CONTROLLING THE SAME

BACKGROUND OF THE INVENTION

Field of the Invention

The present invention relates to a technique for generating an image viewed from a set virtual viewpoint based on images captured from a plurality of viewpoint positions.

Description of the Related Art

A technique of obtaining a three-dimensional model of an object (such as a person for example) from images captured by a plurality of cameras, and generating, from the plurality of captured images, an image (hereinafter referred to as a virtual viewpoint image) at an arbitrary viewpoint (hereinafter referred to as a virtual viewpoint) at which no camera is actually present is known (Japanese Patent No. 5011224).

Also, a technique for adding additional information onto the virtual viewpoint image is also known. Japanese Patent No. 5593356 discloses a technique for displaying an advertisement on a virtual viewpoint image, and Japanese Patent No. 5295416 discloses a technique for adding explanatory information on the virtual viewpoint image.

However, the above described prior art is still insufficient from the perspective of more effectively displaying an object within the virtual viewpoint image.

SUMMARY OF THE INVENTION

According to an aspect of the invention, there is provided a system that generates a virtual viewpoint image based on a plurality of captured images obtained by a plurality of cameras that capture a field from different directions, the system comprising: an obtainment unit configured to obtain virtual viewpoint information relating to a position and direction of a virtual viewpoint; a designation unit configured to designate a focus object from a plurality of objects detected based on at least one of the plurality of images captured by the plurality of cameras; a decision unit configured to decide, based on a position and direction of a virtual viewpoint according to the virtual viewpoint information obtained by the obtainment unit and a position of the focus object designated by the designation unit, an object whose transparency is to be changed from among the plurality of objects; and a generation unit configured to generate, based on the plurality of captured images obtained by the plurality of cameras, a virtual viewpoint image in which the transparency of the object decided by the decision unit is changed.

Further features of the present invention will become apparent from the following description of exemplary embodiments (with reference to the attached drawings).

BRIEF DESCRIPTION OF THE DRAWINGS

FIG. 4 is a view illustrating an example of an object table in the embodiment.
FIG. 9 is a view illustrating an example of a transparency setting.

DESCRIPTION OF THE EMBODIMENTS

A detailed description is given below of an embodiment according to the present invention, in accordance with the drawings.

Figure 1:
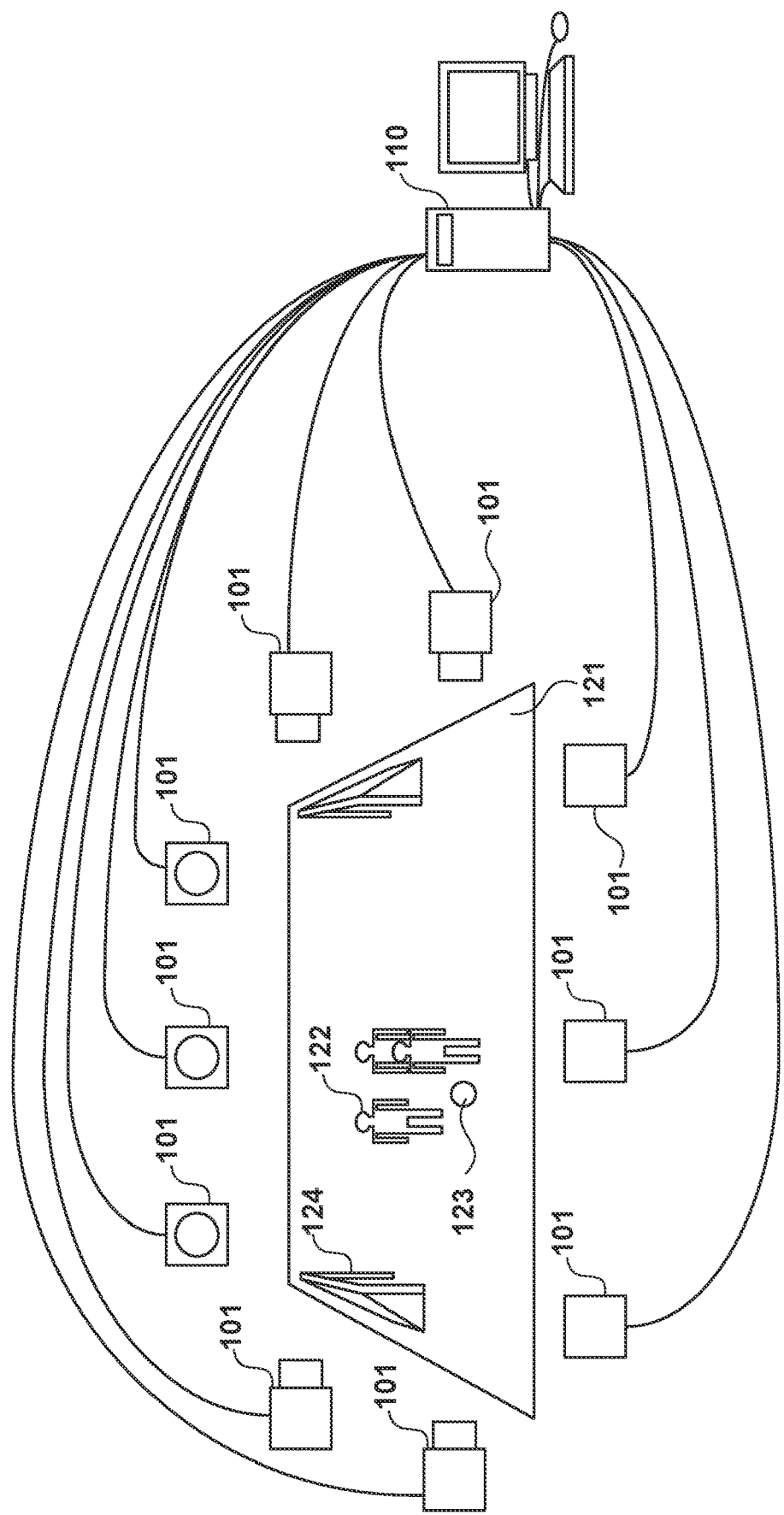
FIG. 1 is a configuration diagram of an image processing system in an embodiment.

FIG. 1 illustrates a capturing environment and configuration of an image processing system in the embodiment. As shown in the figure, the present system is configured by a plurality of cameras 101, and an information processing apparatus 110 that receives and stores images captured by each camera, and generates a virtual viewpoint image. Note, configuration may be taken such that processing of the information processing apparatus 110 is performed distributively by a plurality of apparatuses. For example, configuration may also be taken such that the information processing apparatus 110 is realized by a storage server that stores captured images and an image generation server that generates virtual viewpoint images. Also, a communication path between the cameras 101 and the information processing apparatus 110 may be wired or wireless.

Also, in the embodiment, as shown in the figure, an example in which the plurality of cameras 101 are arranged such that they surround a soccer field is illustrated. A ground 121, a person (such as a player) 122, a ball 123, and a goal post 124 are positioned in the capture target soccer field. Also, the reference numerals in the 120 s are represented as objects in the embodiment. In the present embodiment, objects are detected from the captured images (or images conforming to these) based on a condition set by a user or the like in advance. Note, although there are ten cameras 101 illustrated in the figure, there is no particular restriction on this number. Object blind spots become fewer the larger this number becomes, and so a more accurate virtual viewpoint image can be generated. Also, there is no particular reason that a soccer field is exemplified. It should be understood that the intention of showing a specific example is to facilitate understanding of the present embodiment.

Figure 2:
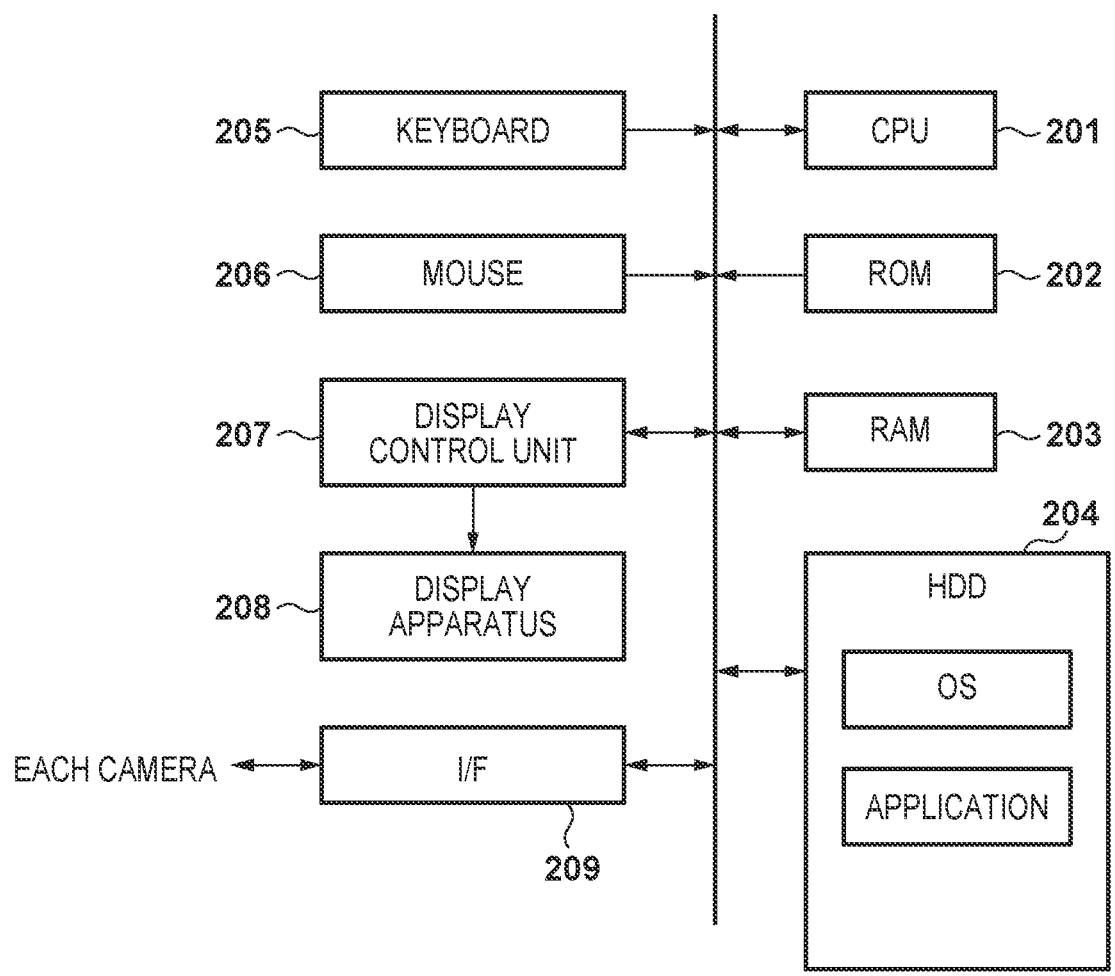
FIG. 2 is a hardware block configuration diagram of an information processing apparatus in the embodiment.

An information processing apparatus 110 has a configuration similar to apparatuses as typified by a personal computer, and has the configuration of FIG. 2 specifically. As shown in the figure, the information processing apparatus 110 has a CPU 201, a ROM 202, a RAM 203, and a hard disk (HDD) 204 as an external storage apparatus. Additionally, it has a keyboard 205, a mouse 206, a display control unit 207, a display apparatus 208, and an interface (I/F) 209 for receiving captured images from the plurality of cameras 101.

An OS (operating system) and an application program for functioning as an image processing apparatus are stored in the HDD 204. Also, the captured images received from the plurality of cameras 101 previously described are stored in the HDD 204. When the power supply of the present apparatus is turned ON, the OS is loaded from the HDD 204 to the RAM 203 and executed by the CPU 201 executing a program stored in the ROM 202. Then, the information processing apparatus functions as the image processing apparatus by an application being loaded from the HDD 204 to the RAM 203 and being executed while the OS is operating.

Information according to an installation position, line of sight direction, and camera parameters (such as focal length) of each camera 101 (hereinafter referred to as input viewpoint information) is assumed to be stored in the HDD 204 that the information processing apparatus has. Also, images that the plurality of cameras 101 captured are assumed to be received via the interface 209 and are stored in the HDD 204.

Figure 3:
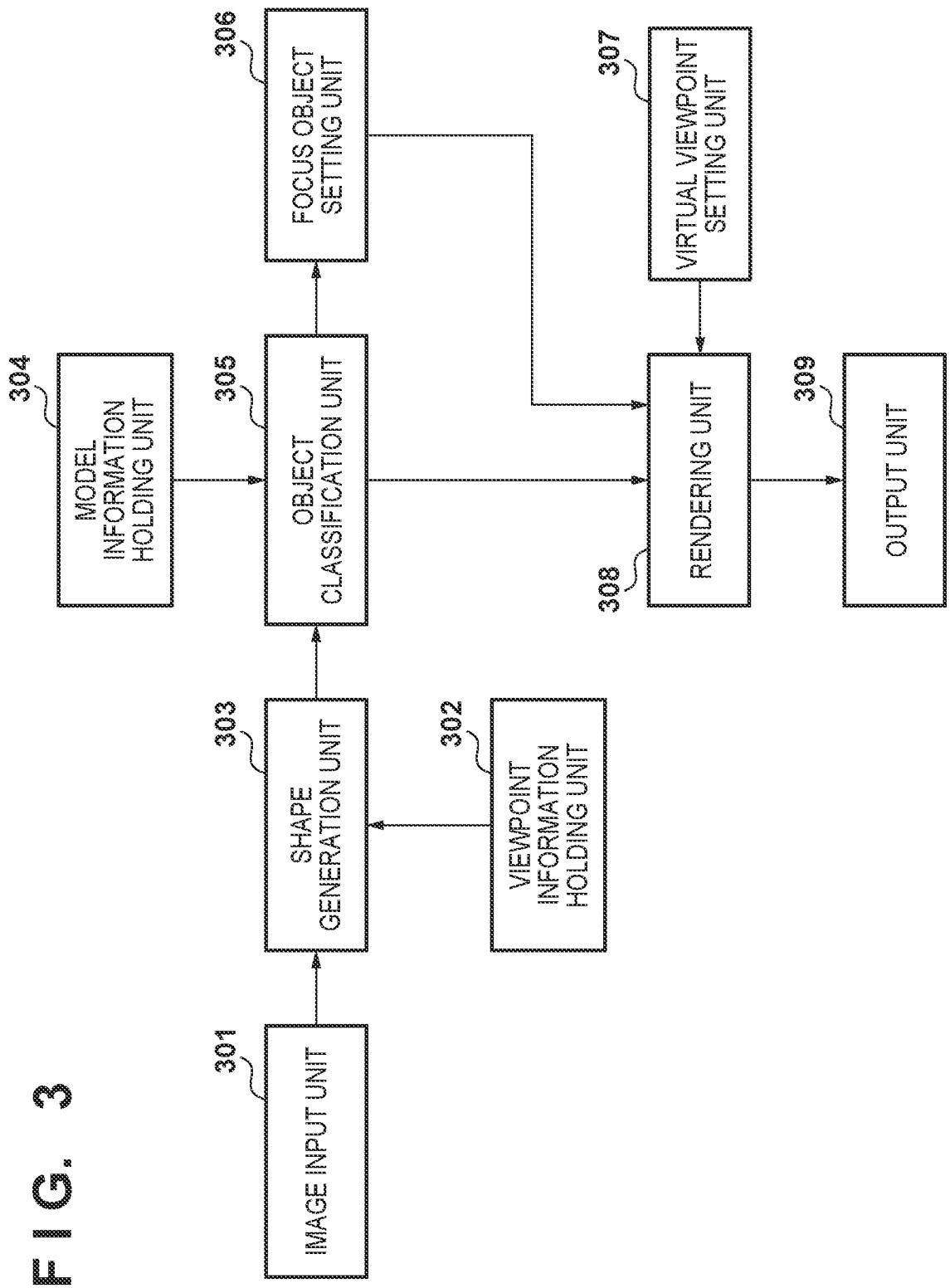
FIG. 3 is a functional block configuration diagram of the image processing apparatus in the embodiment.

FIG. 3 is a functional block configuration diagram of a case where the CPU 201 of the information processing apparatus 110 executes an application program and functions as an image processing apparatus 100. Note, some of the functional units in the figure may also be realized by hardware other than the CPU 201.

The image processing apparatus in the embodiment has an image input unit 301, a viewpoint information holding unit 302, a shape generating unit 303, a model information holding unit 304, an object classification unit 305, a focus object setting unit 306, a virtual viewpoint setting unit 307, a rendering unit 308, and an output unit 309.

Each configuration will be clarified from the description which will be given later, but the features of this embodiment, when described in an easy to understand manner, are as follows.

When capturing images that include an object (not limited to one) by the plurality cameras 101 whose positions and line of sight directions are already known, it is possible to obtain shape information representing the three-dimensional shape of the object by a known technique (the technique disclosed in Japanese Patent No. 5011224 for example). It is possible to obtain depth images corresponding to the images captured by each camera 101 by an arithmetic operation because the shape of the object can be defined in a three-dimensional space. Note that a depth image here is a set of pixels that represent distances between the viewpoint of a camera and points on a surface of an object. Also, for the same reason, it can be understood that it is possible to generate a depth image from an arbitrary viewpoint position at which the camera 101 is not present, in other words, a depth image of a line of sight direction of a virtual viewpoint. When a depth image viewable from the virtual viewpoint is completed, the color of a pixel on the depth image can be obtained by referring to a pixel value of a corresponding position in an actual captured image. If the processing is repeated, generation of a virtual viewpoint image based on a depth image from the perspective of the virtual viewpoint becomes possible.

Normally, when a virtual viewpoint image is generated, a depth image from the virtual viewpoint is obtained first. When a color of an arbitrary position P on the depth image is decided, the color is calculated using pixel values, of two captured images, at positions corresponding to the position P within the depth images of the two captured images. Specifically, this is as follows.

$$Q(x, y) = \text{[EQUATION 1]}$$

$$\frac{\left(\frac{\theta_1}{\theta_1 + \theta_2} \times \frac{W_1(x_1, y_1)}{W_1(x_1, y_1) + W_2(x_2, y_2)}\right)}{W} P_1(x_1, y_1) +$$

$$\frac{\left(\frac{\theta_1}{\theta_1 + \theta_2} \times \frac{W_2(x_2, y_2)}{W_1(x_1, y_1) + W_2(x_2, y_2)}\right)}{W} P_2(x_2, y_2)$$

where $W = \frac{\theta_2}{\theta_1 + \theta_2} \times \frac{W_1(x_1, y_1)}{W_1(x_1, y_1) + W_2(x_2, y_2)} +$ $$\frac{\theta_1}{\theta_1 + \theta_2} \times \frac{W_2(x_2, y_2)}{W_1(x_1, y_1) + W_2(x_2, y_2)}$$

$Q(x,y)$: pixel value of pixel of interest of output image
$P_1(x_1, y_1)$: pixel value of corresponding pixel $(x_1, y_1)$ of first input viewpoint
$P_2(x_2, y_2)$: pixel value of corresponding pixel $(x_2, y_2)$ of first input viewpoint
$\theta_1$: first input viewpoint angle, $\theta_2$: second input viewpoint angle
$W_1(x_1, y_1)$: weighting of corresponding pixel $(x_1, y_1)$ in weighted pixel map of first input viewpoint
$W_2(x_2, y_2)$: weighting of corresponding pixel $(x_2, y_2)$ in weighted pixel map of second input viewpoint Here, as previously described, there is no particular restriction on the position of the set virtual viewpoint or the line of sight direction in the present embodiment. However, although a virtual viewpoint image including an object A that is desired to be focused on should be generated, a case occurs in which another object B is positioned between the virtual viewpoint and the object A at that time, so that an essential object A is blocked by the object B, for example. In such a case, a virtual viewpoint image must be generated after shifting the virtual viewpoint to a position at which the object A is not obstructed by the object B. In other words, a user must give up on the virtual-viewpoint position initially set. By the configuration illustrated in FIG. 3, the present embodiment generates a virtual viewpoint image including an object that is desired to be focused on not being obstructed by another object and at an angle that the user desires. A concrete example is described hereinafter.

Figure 5:
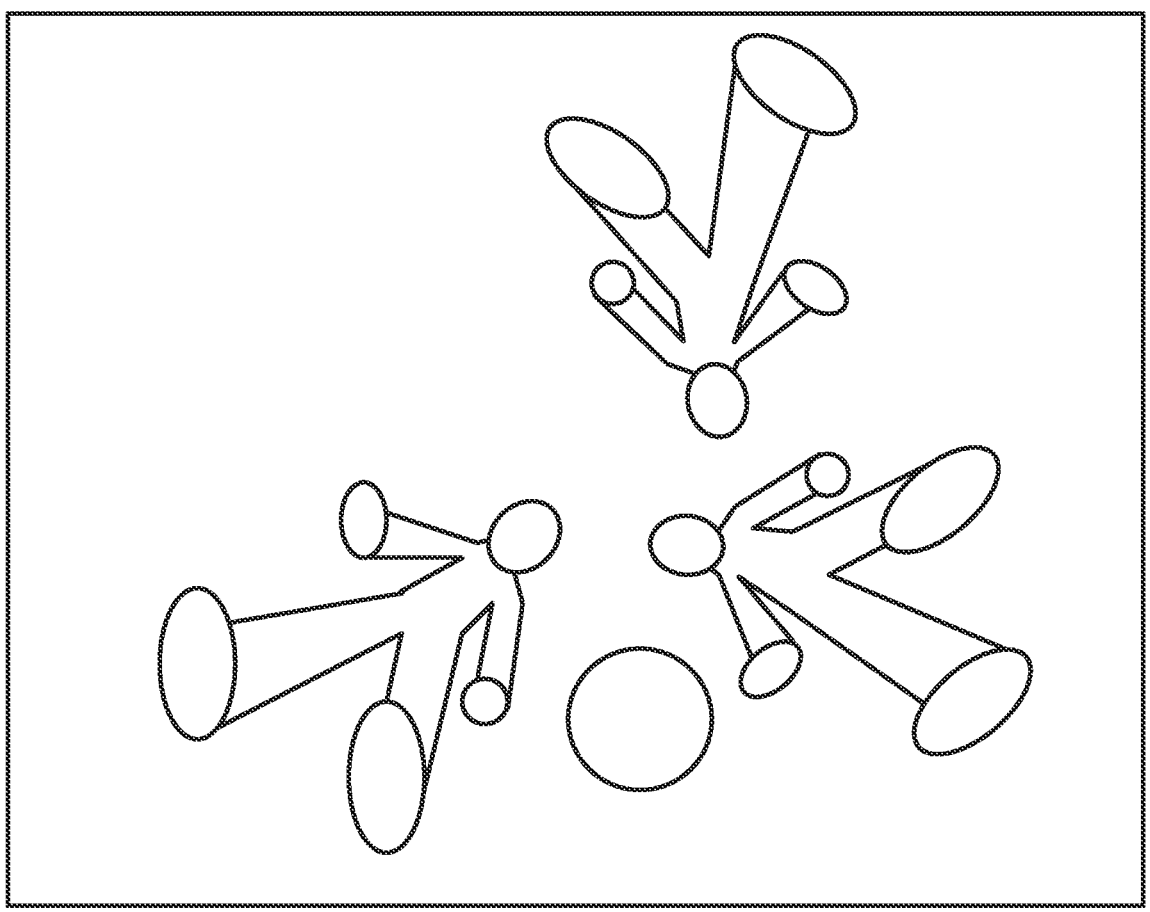
FIG. 5 is a view illustrating an example of a virtual viewpoint image generated by a system of the embodiment.

For example, in a case where a virtual viewpoint image in which the player 122 and the ball 123 are viewed from lower than the ground 121 is generated, the object of the ground 121 becomes transparent. FIG. 5 illustrates an example of a virtual viewpoint image of that time. However, because there are locations which become blind spots even for the plurality of cameras 101, such as the back surface of the shoes of a player, such blind spot locations are generated by interpolating by a color of a closest pixel (a pixel of the edge of the shoe) within an actual captured image.

Figure 6A:
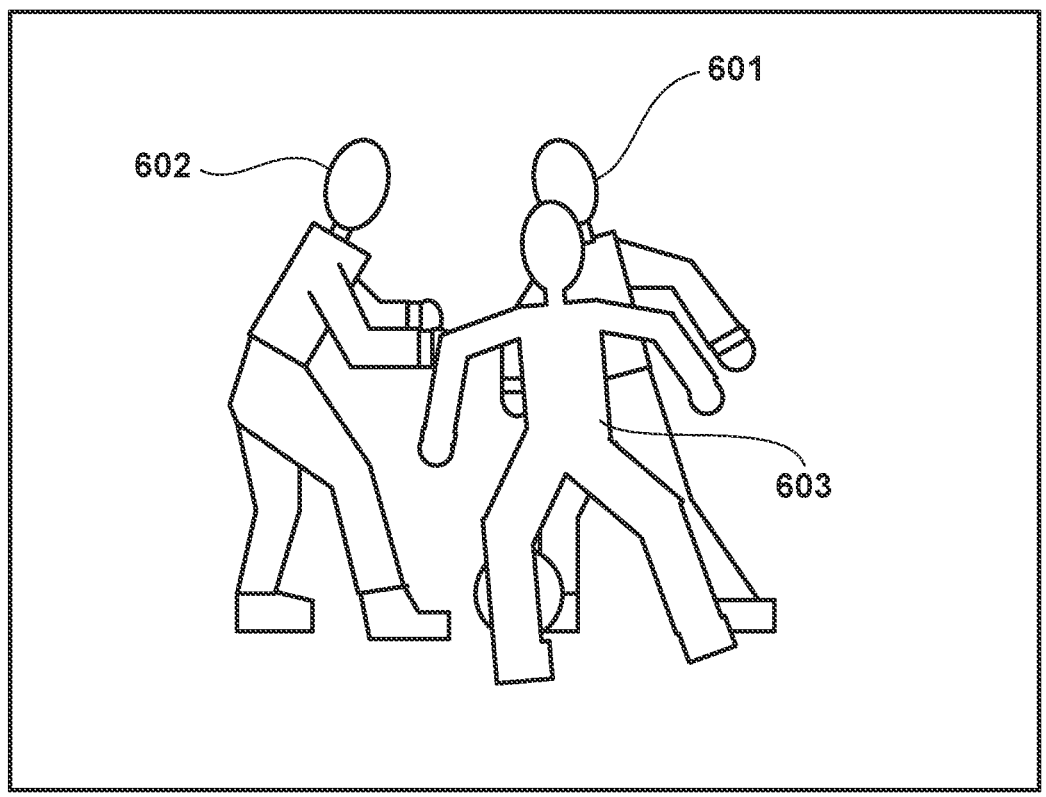
FIGS. 6A and 6B are views illustrating another effect of a virtual viewpoint image generated by a system of the embodiment.

FIG. 6A illustrates an example of a virtual viewpoint image such that players 601 to 603 are surrounding a ball. Now, it is assumed that the user desires to focus on the player 601. However, in the figure, the player 603 is present between the set virtual viewpoint and the player 601 who is desired to be focused on, and thus the player 601 cannot be seen well. Accordingly, in the present embodiment, by the player 603 becoming transparent, a virtual viewpoint image including the desired player 601 and a ball 604 are generated as in FIG. 6B.

In the present embodiment, the user only performs an operation for setting (selecting) an object desired to be focused on, and it is not necessary to explicitly set an object that will be caused to become transparent. Whether or not an object will become transparent is automatically decided in accordance with a positional relationship relative to the virtual viewpoint from among non-focus objects. For example, in FIG. 6A, although the player 601 is set as the object desired to be focused on, no particular setting is made for the players 602 and 603. Also, in FIG. 6B, although the player 603 becomes transparent, the player 602 is rendered as a part of the virtual viewpoint image because the player 602 does not obstruct the player 601 from the virtual viewpoint. Note, the user may employ a configuration in which an object that is caused to become transparent is explicitly designated.

Hereinafter, processing of the image processing apparatus of the embodiment realized above is described with reference to FIG. 3.

The image input unit 301 inputs captured images captured at the same time by the plurality of the cameras 101 from the HDD 204 and supplies them to the shape generating unit 303. The shape generating unit 303 uses the plurality of captured images supplied from the image input unit 301 and viewpoint information (information such as an installation position, line of sight direction, and focal length of each camera) stored in the viewpoint information holding unit 302 to generate shape information representing shapes in a three-dimensional space of the plurality of objects by using a publicly known technique (the technique disclosed in Japanese Patent No. 5011224 for example). Note, it is assumed that for each captured image stored in the HDD 204, information specifying a camera that captured the captured image (a camera ID for example) is stored as a file name. Also, it is assumed that the viewpoint information of each camera stored within the viewpoint information holding unit 302 is also associated with a camera ID and is managed.

Note, the shape information that the shape generating unit 303 generated is in a state in which the plurality of objects are indistinguishable at this stage. The shape generating unit 303 supplies the generated shape information to an object separation unit 305.

The model information holding unit 304 stores and holds in advance three-dimensional model information of an object (a ground, a goal post, a ball, and a person in the embodiment) to be distinguished and a lower limit number to be identified in this model information. For example, for two goal posts are set to be identified. Although description is given later, by storing and holding the information of the lower limit number, for example, it is possible to output an error when two goal posts cannot be identified. Note, configuration may be taken such that an upper limit number to be identified is stored and held in advance in the model information in place of a lower limit number, or in addition to a lower limit number. In this way, in a case where the capture target is a soccer match, for example, it is possible to output an error when five goal posts are distinguished.

The object separation unit 305, by matching the model information of each object stored in the model information holding unit 304 to the shape information from the shape generating unit 303, registers each object to the object table (assumed to be allocated in the RAM 203) as independent objects.

Note, the shape information that the shape generating unit 303 generated is in a state in which the shapes of the goal posts, the ball, and the people are connected via the ground. Accordingly, the model of the ground is matched to the shape information and the object of the ground is decided first. Then, partial shape information representing the object of the ground is deleted from the shape information from the shape generating unit 303. As a result, it is possible for objects other than the ground to be made to be spatially isolated objects. Accordingly, after this, the object separation unit 305 may repeatedly perform a matching and a registration to the object table of the objects that should be separated next (goal posts for example). Note, it is assumed that in a case where detection of the lower limit number for each type of object is not reached, error processing is performed.

FIG. 4 is a view illustrating an example of a generated object table. As shown in the figure, the object table is configured by fields for an object ID, a type, partial shape information, position and orientation information, a focus flag, and a transparency flag. Here, because the type, the partial shape information, and the position and orientation information are clear from the description thus far, description of these should be unnecessary. An object ID is information that is internally issued when the object classification unit 305 classifies each object and that specifies each object. The focus flag and the transparency flag will be clearly described below. Note, not all of the information items in FIG. 4 are essential. For example, if an object whose type is "person" and whose focus flag is "0" is decided in advance to be made transparent, the item of the transparency flag is unnecessary. Conversely, if it is decided in advance to determine that an object whose type is "person" and whose transparency flag is "0" is being focused on, the item of the focus flag is unnecessary. In this manner, various modifications are possible for the information items of FIG. 4.

Figure 7:
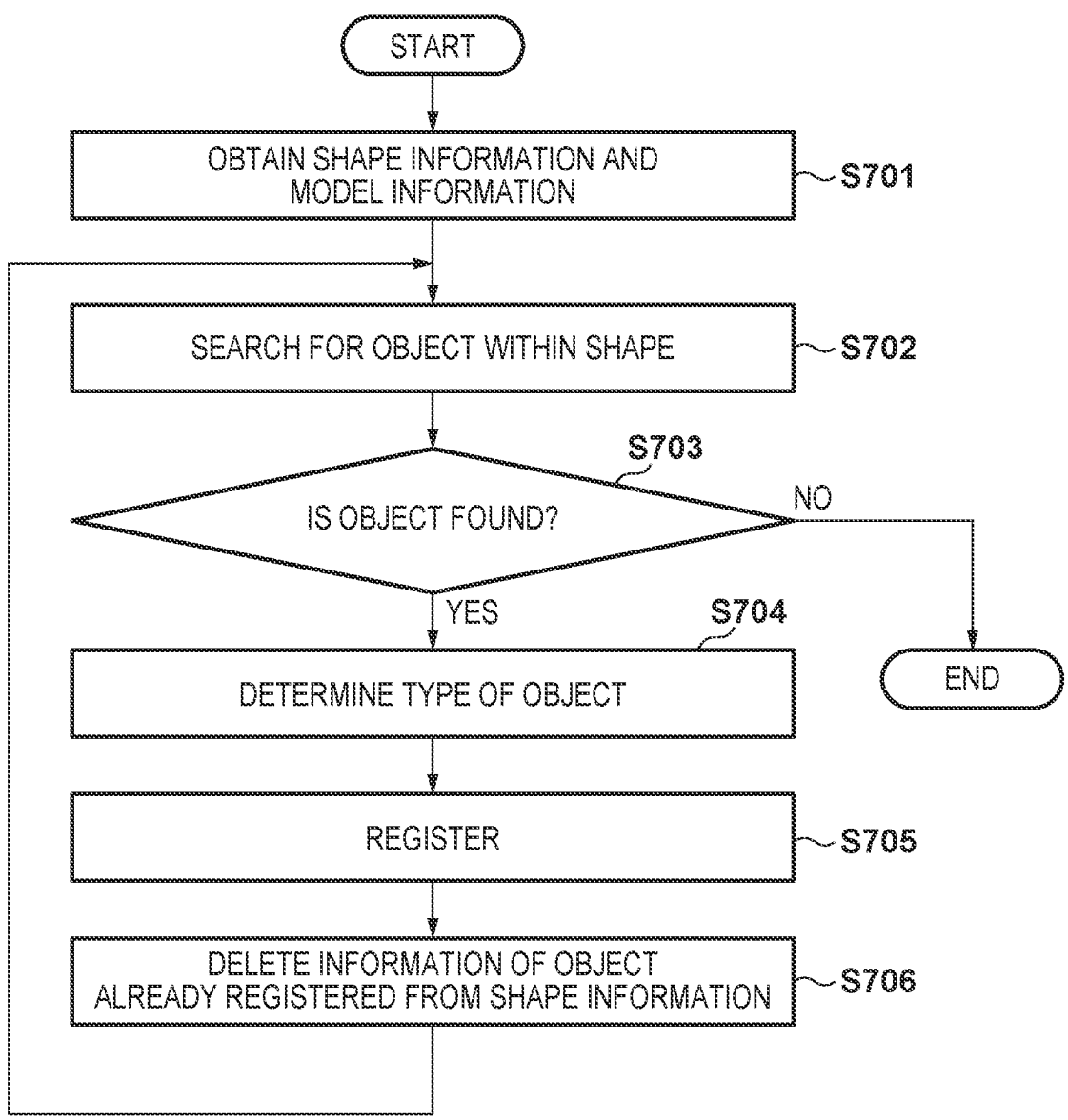
FIG. 7 is a flowchart illustrating classification processing of an object classification unit in the embodiment.

FIG. 7 is a flowchart illustrating processing contents of the object classification unit 305 in the embodiment. In accordance with the figure, the processing contents are described below.

The object classification unit 305, in step S701, obtains shape information from the shape generating unit 303 and model information stored in the model information holding unit 304. Then in step S702, the object classification unit 305 uses the model of one object within the model information to search for whether a partial shape that matches to the corresponding model is present, at what position and in what direction (orientation), by matching to the shape information. Then, the object classification unit 305 determines that a matching partial shape is discovered (step S703), and the processing is advanced to step S704. In step S704, the object classification unit 305 determines the type of the model that was found, and issues it an object ID. Then, in step S705, the object classification unit 305 registers, in the object table, the object ID, the type of model, the partial shape information, and position and orientation information representing a position of the object that the partial shape information indicates within the three-dimensional space and an orientation at which the model matched. Note, information that should be registered in the object table is not limited to the foregoing example, and configuration may be taken such that more information is registered or such that only some of the foregoing information items are registered. Then, in step S706, the object classification unit 305 deletes the already registered partial shape information from the shape information such that there is no overlapping registration of the same partial shape information. After this, the object classification unit 305 returns the processing to step S702, and repeats classification of objects until no more can be found. Note, as previously described, it is assumed that, in a case where the lower limit number is not satisfied for one of the types of objects, error processing is performed. The above is processing of the object classification unit 305 in the embodiment.

When the object table is generated, the focus object setting unit 306 allows the user to set which object is desired to be focused on. As a concrete example, the virtual viewpoint image is generated at a particular virtual viewpoint and is displayed on the display apparatus 208 based on the partial shape information of all objects of the generated object table for example. Then, the user is prompted to perform an operation by the keyboard 205 or the mouse 206 to set one or more objects that are desired to be focused on (the upper limit of the number of objects desired to be focused on is the number of objects registered in the object table). "Focus flag" in the object table of FIG. 4 is information indicating whether or not the object is an object desired to be focused on. "1" indicates that the object is an object desired to be focused on (hereinafter referred to as a focus object), and "0" indicates that the object is an object that need not be focused on (hereinafter referred to as a non-focus object). Note, in the present embodiment, description is centered on a configuration in which the user designates a focus object, but there is no limitation to this. For example, the user may designate a non-focus object (an object desired to become transparent). An object designated as a non-focus object by the user may be made to be always transparent, and configuration may be taken such that it is becomes transparent in a case where it is present at a position where it is impeding the view of another object. Also, configuration may be taken such that the user can designate both a focus object and a non-focus object. In such a case, in addition to the non-focus objects, an object impeding the display of the focus object is made to be transparent, even if it is not designated as a non-focus object.

The virtual viewpoint setting unit 307 sets virtual viewpoint information indicating a virtual viewpoint position and a line of sight direction in accordance with an operation from the keyboard 205 or the mouse 206 by the user, and this virtual viewpoint information is supplied to the rendering unit 308.

Then, the rendering unit 308 generates a virtual viewpoint image viewable from the set virtual viewpoint and outputs it to the output unit 309 based on the object table and virtual viewpoint information. The output destination of the virtual viewpoint image by the output unit 309 is the display apparatus 208 and/or the HDD 204. Outputting means displaying the virtual viewpoint image in the case of the display apparatus 208, and means saving as a file in a case of the HDD 204.

Here, processing of the rendering unit 308 in the embodiment is described hereinafter in accordance with the flowchart of FIG. 8.

Firstly, in step S801, the rendering unit 308 inputs the virtual viewpoint that the virtual viewpoint setting unit 307 set. Then, in step S802, the rendering unit 308 inputs information of one object from the object table (hereinafter referred to as an object of interest). In step S803, the rendering unit 308 determines whether or not the object of interest is a non-focus object from the focus flag of the object of interest. In a case where the object of interest is a non-focus object, in step S804, the rendering unit 308 determines, from the perspective of the virtual viewpoint, whether or not the object of interest blocks at least one focus object by referencing the position and orientation information of the object table. This determination may be as follows, for example.

A distance between the position of the virtual viewpoint and (a barycentric position of) the focus object is defined to be L A distance between the position of the virtual viewpoint and the object of interest (non-focus object) is defined to be L'.

The position of the virtual viewpoint is made to be a reference, and an angle formed by the focus object and the object of interest is defined to be θ.

A threshold Th set in advance is defined.

Here, when there is a focus object that satisfies the following condition:

$$\text{condition: } L > L' \text{ and } \theta < Th \quad (1)$$

it is determined that an object of interest (non-focus object) is positioned such that it blocks the focus object from the perspective of the virtual viewpoint. In other words, an object of interest that satisfies L<L' does not block the focus object.

Note, although the determination speed will be slower, to increase the determination accuracy, the size of each object, the distance from the virtual viewpoint, a display magnification at the virtual viewpoint, or the like may also be considered.

In the determination of step S804, in a case where it is determined that the object of interest (non-focus object) blocks the focus object, the rendering unit 308 advances the processing to step S805, and decides that the object of interest will become transparent. Accordingly, the rendering unit 308 sets the transparency flag to "1" because the object of interest within the object table is made to be a transparent object.

Meanwhile, in a case where it is determined in step S803 that the object of interest is a focus object (the focus flag is "1"), or in a case where it is determined in step S804 that the object of interest (non-focus object) is not blocking another focus object, the rendering unit 308 in step S806 sets the transparency flag of the object of interest to "0" because the object of interest is made to be a non-transparent object.

In step S807, the rendering unit 308 determines whether or not transparency/non-transparency was decided for all objects within the object table, and if not, repeats the processing of step S802 onward.

In this way, when setting processing for transparency/non-transparency has ended for all objects within the object table, the rendering unit 308 advances the processing to step S808. In step S808, the rendering unit 308 excludes (does not use) the partial shape information of objects whose transparency flag is "1" in the object table, performs processing for generating a virtual viewpoint image based on the partial shape information of objects whose transparency flag is "0" (does not become transparent) in the object table, and outputs the generated the virtual viewpoint image to the output unit 309. Because the virtual viewpoint image is generated in a state equivalent to one in which the objects that are made to be transparent are not present, non-focus objects present between the virtual viewpoint and a focus object ultimately end up being treated as transparent objects. In other words, it becomes possible to suppress a focus object being blocked by a non-focus object.

Now, in a case where the virtual viewpoint is set to a line of sight direction lower than the ground and looking up, the transparency flag of the ground becomes "1", and it becomes possible to generate a virtual viewpoint image as in FIG. 5 as a result.

Figure 6B:
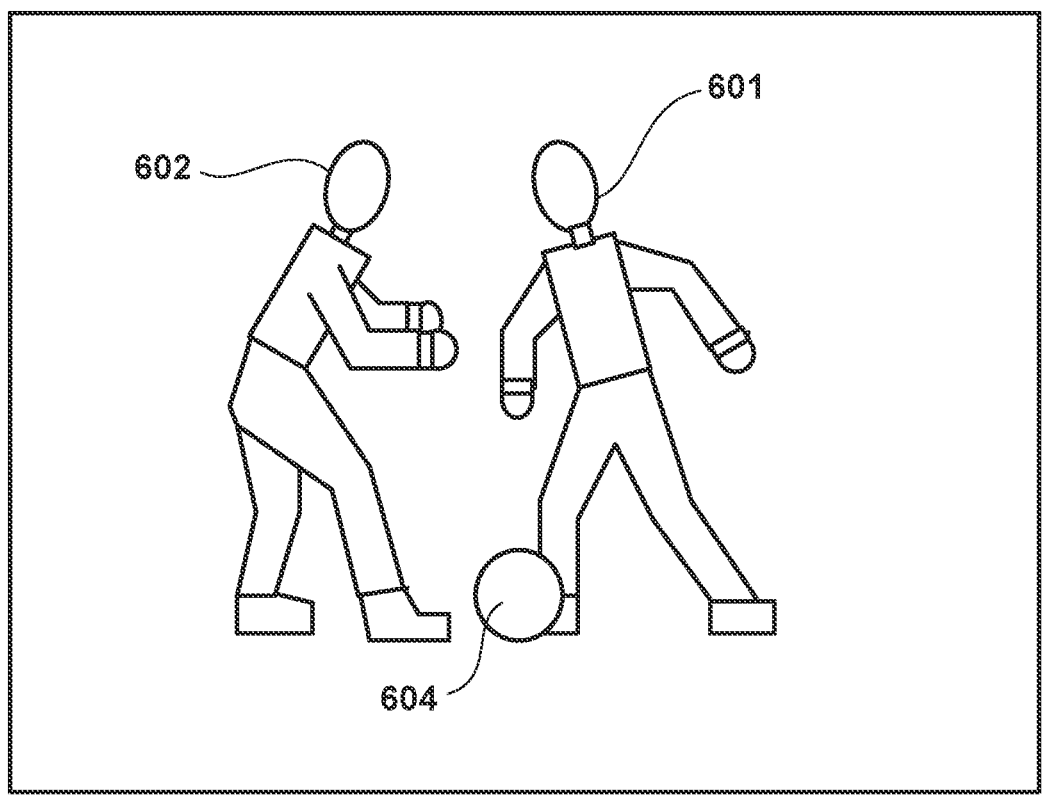

Also, for example, in FIG. 6A, in a case where the user sets the player 601 as the focus object (the players 602 and 603 become non-focus objects), the player 603 positioned such that he is blocking the focus object is determined to be a transparent object and a virtual viewpoint image illustrated in FIG. 6B is generated.

By virtue of the present embodiment as described above, it becomes possible to maintain a position of a virtual viewpoint set by a user and to generate a virtual viewpoint image in which an object that is desired to be focused on without is not blocked by an object that need not be focused on. Accordingly, it becomes possible to, when a play by a super star in a soccer match for example became blocked by another player, generate a virtual viewpoint image.

Note, the foregoing embodiment describes not using partial shape information of the non-focus object for rendering in a case where a non-focus object is determined to be made transparent. However, in some cases configuration may be taken to indicate that an object is present in front of a focus object from the perspective of the virtual-viewpoint position. In such a case, a non-focus object whose transparency flag is "1" may be superimposed in a form of a predetermined color or dashed lines indicating its outline for example. In this way, it becomes possible for the user (viewer) to view the focus object while recognizing the presence of the transparent object within the virtual viewpoint image.

Figure 8:
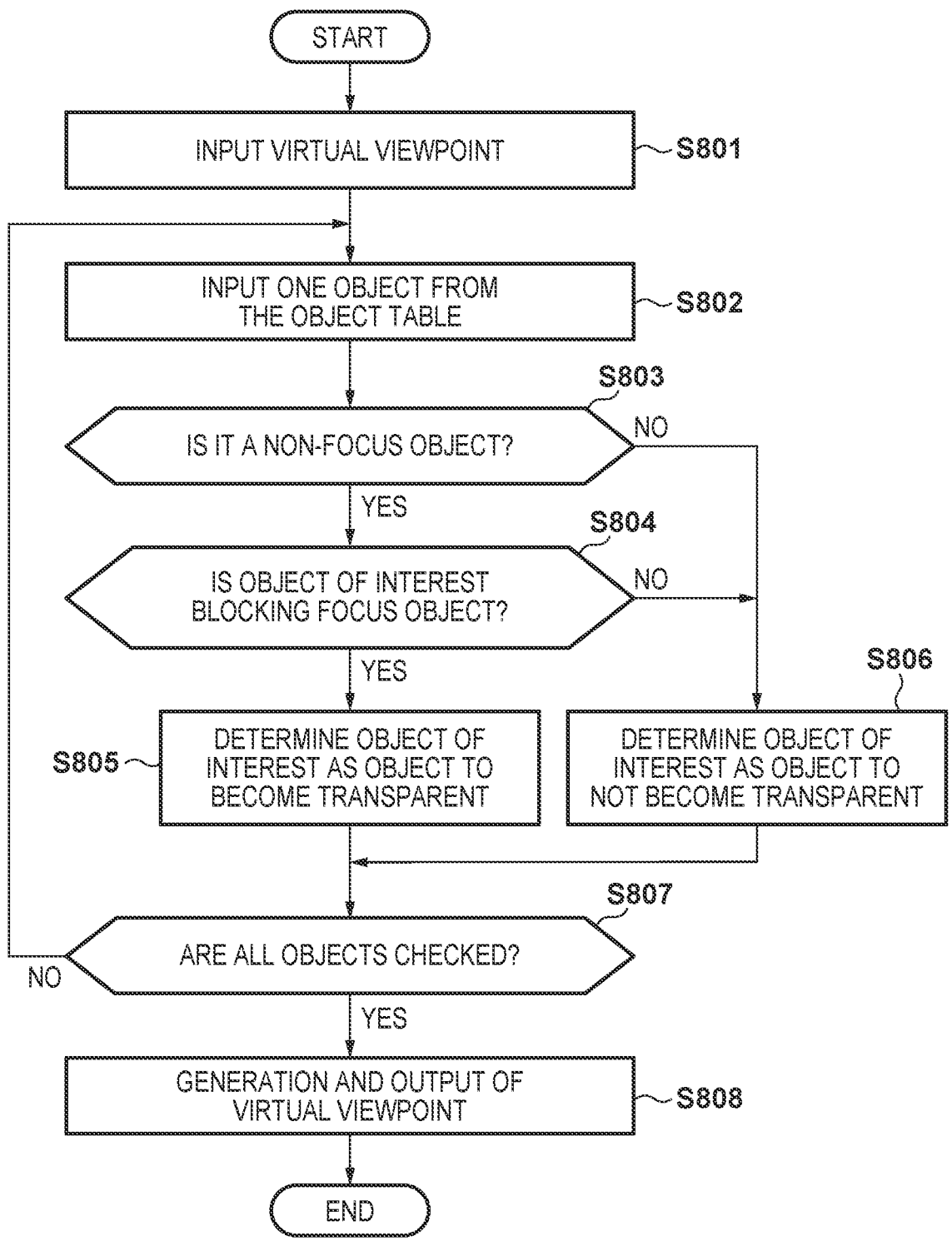
FIG. 8 is a flowchart illustrating processing content of a rendering unit in the embodiment.

Also, the description of FIG. 8 is merely one method for achieving the foregoing objective, and various modifications are possible. For example, although configuration was taken such that the processing of step S802 to step S806 was performed for all objects in FIG. 8, configuration may be taken such that objects that have a possibility of blocking the focus object are chosen based on the position and direction for the virtual viewpoint and the focus object, and the processing of step S802 to step S806 is performed only for the chosen objects. In other words, the information processing apparatus 102 of the present embodiment decides objects that should become transparent (including complete transparency and semi-transparency) based on the position of the focus object and the position of the virtual viewpoint. By virtue of the present embodiment, it becomes possible for the user (viewer) to observe the position or movement of a focus object.

Also, although description is centered on an example of a case where a focus object is designated by the user in FIG. 8, as described above, configuration may be taken such that the user can designate a non-focus object in place of the focus object, or in addition to the focus object. In a case where it is determined in advance that the non-focus object designated by the user will be made transparent, the processing of at least step S804 of FIG. 8 is unnecessary. Also, in the object table of FIG. 4, a non-focus flag may be added.

Also, in the foregoing embodiment, although description is centered on an example in which it is decided whether or not to make an object transparent in units of objects, configuration may be taken such that it is decided whether or not to make an object transparent in units of partial regions of an object. For example, configuration may be taken such that, in an object (player), only a portion (and the periphery thereof) that is a shadow of the ball (focus object) becomes transparent and portions other than this do not become transparent. In this way, the user (viewer) can confirm the position and movement of non-focus objects while confirming the position of the focus object. In order to be able to make transparent a part of an object, rather than its entirety, a step for specifying a region blocking the object becomes necessary in FIG. 8. Also, in the object table of FIG. 4, an ID can be added to each region of the object.

Second Embodiment

In the foregoing embodiment, processing for generating one virtual viewpoint image is described. In a case where each camera 101 has the ability to capture at 60 frames/second, it becomes possible to generate virtual viewpoint images as a movie.

Here, it is assumed that movies of each camera that are captured at the same time slots are already stored in the HDD 204 in order to simplify the description. In such a case, the same processing as the first embodiment may be repeated to extract frame images of the same timings from these movies.

However, in order to generate a virtual viewpoint movie with good efficiency, a path of movement in the time axis of the virtual viewpoint can be set by the user and stored in advance. Also, a focus object can be set by the user based on an initial captured image of a movie prior to the generation processing for the virtual viewpoint movie. The relative positional relationship between the virtual viewpoint and each object changes in intervals of 1/60 seconds. Because the running speed of a person is at most 10 m/second, a coordinate position change in an interval of 1/60 seconds will not exceed 20 cm. As a result, configuration may be taken such that, although the position and orientation information within the object table changes, the closest object ID within an allowed positional change that was set in advance continues to be used in relation to an immediately preceding frame for the second or higher frame. Note, because the ball can move at a sufficiently higher speed than a person, it is necessary to perform classification processing for the ball object every time. Accordingly, it is advantageous that an attribute making object classification necessary every time be added to the ball model within the model information holding unit 304.

As a result of the foregoing, it becomes possible to generate movie data of the virtual viewpoint at which a focus object is not obstructed by a non-focus object in accordance with the path of movement of the virtual viewpoint that the user set.

Third Embodiment

When generating a virtual viewpoint image, it becomes unnatural to generate an image focusing on all the pixels of the virtual viewpoint. Accordingly, configuration may be taken such that a depth of field (range of focus) is made to be between the closest focus object from the virtual viewpoint and the furthest focus object from the virtual viewpoint, and such that blur increases the more the distance deviates from the depth of field. It is possible to replace blur processing with a smoothing filter.

Fourth Embodiment

In the foregoing first through third embodiments, description is given focusing on an example in which it is decided whether or not a non-focus object of interest will become transparent in a case where condition (1) shown previously is satisfied.

However, configuration may be taken such that it is possible to set a transparency a within a range of 0 to 100%. The transparency a in this case is defined as illustrated in FIG. 9. Here, L, L', and θ have the same meanings as are used in condition (1) described previously.

$$\alpha = F(L, L', \theta)$$

Here, a relates to L, L', and θ as follows.

"α is 0 when L<L' (opaque)"

"α becomes larger as θ becomes smaller"

"α becomes larger as L becomes smaller (the closer the virtual viewpoint is to the focus object)

To simply, function F( ) is $$\alpha = F(\ ) = k/(L \cdot \theta + C)$$

Here, k is a coefficient and C is a constant for a non-zero denominator.

Note, there is no limitation to the method of deciding transparency shown above. For example, configuration may be taken such that transparency increases the smaller the difference between L and L' becomes. In this way, because an object that is near an object of interest becomes transparent, the possibility of the object of interest becoming easier to view is improved. Meanwhile, configuration may be taken such that transparency increases the larger the difference between L and L' becomes. In this way, because the transparency of an object that is nearby an object of interest becomes lower, the real conditions of the surroundings of the object of interest becoming easier to see. Also, configuration may be taken such that transparency increases the smaller L' becomes. With such a configuration, because transparency of a non-focus object present at a position that is nearer to a virtual viewpoint becomes greater, the possibility of the object of interest becoming easier to view is improved. In this way, it is possible to make various changes to the method of deciding the transparency of a non-interest object in accordance with one's objectives.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By virtue of the present embodiment, it becomes possible to generate a virtual viewpoint image more effectively representing an object that should be focused on.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194778, filed Sep. 30, 2016 which is hereby incorporated by reference herein in its entirety.

What is claimed is:

1. An image processing apparatus comprising:
one or more hardware processors; and
one or more memories which store instructions executable by the one or more hardware processors to:
obtain virtual viewpoint information for specifying a virtual viewpoint position and a view direction that correspond to a virtual viewpoint image based on images obtained by image capturing with a plurality of image capturing apparatuses at different positions;
obtain designation information according to operation for designating at least one of a plurality of objects;
obtain object information for specifying three-dimensional positions of the plurality of objects;
generate, based on the obtained virtual viewpoint information and the obtained object information, the virtual viewpoint image, in which a non-specified object, among the plurality of objects, different from a specified object, among the plurality of objects, specified based on the obtained designation information, is displayed with a transparency associated with three-dimensional positions of the specified object and the non-specified object specified based on the obtained object information, the transparency of the non-specified object in the virtual viewpoint image depending at least on a distance between the three-dimensional positions of the specified object and the non-specified object so that:
a transparency of a non-specified first object, among the plurality of objects, in the virtual viewpoint image is higher than a transparency of a non-specified second object, among the plurality of objects, in the virtual viewpoint image in a case where a distance between the three-dimensional positions of the specified object and the non-specified first object is shorter than a distance between the three-dimensional positions of the specified object and the non-specified second object.

2. The apparatus according to claim 1, wherein, in comparison with the transparency of the non-specified object in a case where the specified object and the non-specified object are in a predetermined positional relationship, the transparency of the non-specified object in a case where the specified object and the non-specified object are closer to each other is higher.

3. The apparatus according to claim 1, wherein the transparency of the non-specified object in the virtual viewpoint image depends upon closeness between the specified object and the non-specified object as viewed from the virtual viewpoint.

4. The apparatus according to claim 1, wherein the transparency of the non-specified object in the virtual viewpoint image depends upon a difference between a direction from the virtual viewpoint to the specified object and a direction from the virtual viewpoint to the non-specified object.

5. The apparatus according to claim 1, wherein the transparency of the non-specified object in the virtual viewpoint image depends upon a relationship between a distance from the virtual viewpoint to the specified object and a distance from the virtual viewpoint to the non-specified object.

6. The apparatus according to claim 1, wherein, in a case where a distance from the virtual viewpoint to the specified object is shorter than a distance from the virtual viewpoint to the non-specified object, the non-specified object is not made transparent.

7. The apparatus according to claim 1, wherein the transparency of the non-specified object in the virtual viewpoint image depends upon a distance between the virtual viewpoint and the specified object.

8. The apparatus according to claim 1, wherein the transparency of the non-specified object in the virtual viewpoint image continuously changes in association with a change of the positions of the specified object and the non-specified object.

9. The apparatus according to claim 1, wherein the position of an object indicated by the object information is a center position of the object.

10. The apparatus according to claim 1, wherein, in the virtual viewpoint image:
the transparency of a first non-specified object, among the plurality of objects, occluding the specified object as viewed from the virtual viewpoint is higher than the transparency of a second non-specified object, among the plurality of objects, not occluding the specified object as viewed from the virtual viewpoint; and
the transparency of the first non-specified object occluding the specified object depends upon closeness between the specified object and the first non-specified object.

11. The apparatus according to claim 1, wherein, in the generated virtual viewpoint image, the non-specified object on a position occluding the specified object is not displayed.

12. The apparatus according to claim 11, wherein the virtual viewpoint image is generated by performing rendering without information representing a three-dimensional shape of the non-specified object on a position occluding the specified object.

13. The apparatus according to claim 11, wherein the generated virtual viewpoint image includes information representing an outline of the non-specified object on a position occluding the specified object.

14. The apparatus according to claim 1, wherein, in the generated virtual viewpoint image, a non-specified object, among the plurality of objects, on a position not occluding the specified object is not made transparent.

15. The apparatus according to claim 1, wherein the designation information is information identifying an object designated by the operation and an object not designated by the operation.

16. The apparatus according to claim 1, wherein the plurality of objects include a person within an imaging area of the plurality of image capturing apparatuses.

17. An image processing method comprising:
obtaining virtual viewpoint information for specifying a virtual viewpoint position and a view direction that correspond to a virtual viewpoint image based on images obtained by image capturing with a plurality of image capturing apparatuses at different positions;
obtaining designation information according to operation for designating at least one of a plurality of objects;
obtaining object information for specifying a three-dimensional positions of the plurality of objects; and
generating, based on the obtained virtual viewpoint information and the obtained object information, the virtual viewpoint image, in which a non-specified object, among the plurality of objects, different from a specified object, among the plurality of objects, specified based on the obtained designation information, is displayed with a transparency associated with three-dimensional positions of the specified object and the non-specified object specified based on the obtained object information, the transparency of the non-specified object in the virtual viewpoint image depending at least on a distance between the three-dimensional positions of the specified object and the non-specified object so that:
a transparency of a non-specified first object, among the plurality of objects, in the virtual viewpoint image is higher than a transparency of a non-specified second object, among the plurality of objects, in the virtual viewpoint image in a case where a distance between the three-dimensional positions of the specified object and the non-specified first object is shorter than a distance between the three-dimensional positions of the specified object and the non-specified second object.

18. The method according to claim 17, wherein, in comparison with the transparency of the non-specified object in a case where the specified object and the non-specified object are in a predetermined positional relationship, the transparency of the non-specified object in a case where the specified object and the non-specified object are closer to each other is higher.

19. The method according to claim 17, wherein the transparency of the non-specified object in the virtual viewpoint image depends upon closeness between the specified object and the non-specified object as viewed from the virtual viewpoint.

20. A non-transitory computer-readable storage medium storing a program executable by a computer to execute an image processing method comprising:
obtaining virtual viewpoint information for specifying a virtual viewpoint position and a view direction that correspond to a virtual viewpoint image based on images obtained by image capturing with a plurality of image capturing apparatuses at different positions;
obtaining designation information according to operation for designating at least one of a plurality of objects;
obtaining object information for specifying a three-dimensional positions of the plurality of objects; and
generating, based on the obtained virtual viewpoint information and the obtained object information, the virtual viewpoint image, in which a non-specified object, among the plurality of objects, different from a specified object, among the plurality of objects, specified based on the obtained designation information, is displayed with a transparency associated with three-dimensional positions of the specified object and the non-specified object specified based on the obtained object information, the transparency of the non-specified object in the virtual viewpoint image depending at least on a distance between the three-dimensional positions of the specified object and the non-specified object so that:
a transparency of a non-specified first object, among the plurality of objects, in the virtual viewpoint image is higher than a transparency of a non-specified second object, among the plurality of objects, in the virtual viewpoint image in a case where a distance between the three-dimensional positions of the specified object and the non-specified first object is shorter than a distance between the three-dimensional positions of the specified object and the non-specified second object.

* * * * *